United States Patent [19]

Miglin

[11] Patent Number: 5,244,515
[45] Date of Patent: Sep. 14, 1993

[54] HEAT TREATMENT OF ALLOY 718 FOR IMPROVED STRESS CORROSION CRACKING RESISTANCE

[75] Inventor: Marie T. Miglin, North Canton, Ohio

[73] Assignee: The Babcock & Wilcox Company, New Orleans, La.

[21] Appl. No.: 845,126

[22] Filed: Mar. 3, 1992

[51] Int. Cl.$^5$ .............................................. C22F 1/00
[52] U.S. Cl. ................................... 148/675; 148/677; 420/410
[58] Field of Search ................. 148/675, 677; 420/410

[56] References Cited

U.S. PATENT DOCUMENTS

| | | | |
|---|---|---|---|
| 4,199,850 | 4/1980 | Velan | 29/157.1 |
| 4,652,315 | 3/1987 | Igarashi et al. | 148/677 |
| 4,788,036 | 11/1988 | Eiselstein et al. | 420/448 |
| 4,798,632 | 1/1989 | Yonezawa et al. | 148/677 |
| 4,981,644 | 1/1991 | Chang | 420/442 |
| 5,047,093 | 9/1991 | Kimmerle et al. | 148/162 |

OTHER PUBLICATIONS

Ian L. W. Wilson, Improved Stress Corrosion Resistance of High Strength Ni-Cr-Fe Alloys RP2181-2, EPRI contractor's meeting, Oct. 1, 1987.

Miglin et al, Effect of Heat Treatment on Stress Corrosion of Alloy 718 In PWR Primary Water, 5th Symposium, Monterey, Calif., Aug. 25-29, 1991.

M. T. Miglin and J. L. Nelson, "Strain Rate Sensitivity of Alloy 718 Stress Corrosion Cracking," TMS, Warrendale, Pa., Jun. 1991.

Copies of Overheads presented at oral presentation at an EPRI's contractors meeting on Mar. 5, 1991.

Primary Examiner—Uprendra Roy
Attorney, Agent, or Firm—Vytas R. Matas; Robert J. Edwards; Daniel S. Kalka

[57] ABSTRACT

A method of increasing intergranular stress corrosion cracking resistance of Alloy 718 in water reactor environments is described where the alloy is heat treated at a high solution annealing temperature to dissolve grain boundary precipitates formed during thermomechanical processing. A water quenching step is advantageously employed following the high solution annealing. The alloy is then aged at two separate temperatures and finally air cooled to room temperature.

4 Claims, 2 Drawing Sheets

Results of SCC tests in 360 C PRW primary water for alloy 718 in the conventional heat treatment condition.

Results of SCC tests in 360 C PWR primary water for alloy 718 in the SCC-resistant heat treament condition.

Results of SCC tests in 360 C PRW primary water for alloy 718 in the conventional heat treatment condition.

HEAT TREATMENT OF ALLOY 718 FOR IMPROVED STRESS CORROSION CRACKING RESISTANCE

BACKGROUND OF THE INVENTION

Field of the Invention

The present invention relates generally to a method for increasing intergranular stress corrosion cracking (IGSCC) resistance of Alloy 718 and, more particularly, to an improved heat treatment method that improves the stress corrosion cracking resistance of this Alloy in light water reactor (LWR) environments, including hydrogenated aqueous environments such as pressurized water reactors.

Description of the Related Art

Alloy 718 is the most widely used iron-nickel-base superalloy. It was invented in 1962 by H.L. Eiselstein and patented in U.S. Pat. No. 3,046,108. U.S. Pat. No. 4,788,036 describes further modifications and uses of this alloy. This alloy possesses excellent strength, low cycle fatigue, and creep behavior in addition to outstanding corrosion resistance in many environments. In addition, this alloy is weldable and highly fabricable as discussed in U.S. Pat. No. 4,981,644. Because of this, Alloy 718 has been used extensively in the aerospace industry and is being used more extensively in the nuclear power industry where high strength and excellent stress corrosion cracking resistance are important design criteria.

Since Alloy 718 was originally utilized in the aerospace industry, present heat treatment techniques for this Alloy were designed to optimize the high temperature mechanical properties required for air-breathing jet engine environments. The material requirements within the nuclear power industry are significantly different from those in aerospace applications, and thus, different heat treatment techniques are necessary. In particular, even though Alloy 718 has performed relatively well in light water reactor (LWR) environments, some failures have occurred, and it has been determined that many of these failures are the result of intergranular stress corrosion cracking (IGSCC).

U.S. Pat. No. 5,047,093 issued to Assignee of the present invention which is hereby incorporated by reference discloses a method for increasing intergranular stress corrosion cracking resistance of Alloy 718 in water reactor environments. The present invention is an improvement on that heat treatment method to provide improved corrosion resistance with minimal loss in material strength.

For reactor applications, Alloy 718 is usually given one of several similar heat treatments originally developed for aerospace applications. These heat treatments produce room-temperature yield strengths near 1100 MPa, and are designed for maintaining roughly 85% of room-temperature yield strength over extended exposures at 650° C. However, heat treatments designed for microstructural stability at high temperature may not provide optimal stress corrosion resistance in the 290° to 360° C. aqueous environments typical of nuclear service.

Accordingly, there is a need for a method to increase the IGSCC performance of stock or unwelded Alloy 718 in light water reactor environments, including hydrogenated aqueous environments such as pressurized water reactors.

SUMMARY OF THE INVENTION

The present invention solves the aforementioned problems associated with the prior art as well as others by providing a method which improves the stress corrosion cracking resistance of Alloy 718 material. The method of the present invention includes a high solution annealing temperature which dissolves the grain boundary precipitates which were formed during thermomechanical processing of the ingot. These precipitates may include Laves, delta (δ), and MC carbides although they have not yet been precisely identified.

The method of the present invention comprises the steps of solution annealing the alloy at about 1093° C. for about one hour, water quenching, aging at about 718° C. for about eight hours and furnace cooling at about 55° C. per hour to about 621° C., and finally aging at about 621° C. for about eight hours and air cooling to room temperature.

An object of the present invention is to provide an improved heat treatment of Alloy 718 which increases the resistance to stress corrosion cracking (SCC) in aqueous environments with excess hydrogen such as pressurized water-reactor primary water and other light water reactor environments.

The various features of novelty characterized in the invention are pointed out with particularity in the claims annexed to and forming a part of this disclosure. For a better understanding of the invention, and the operating advantages attained with its uses, reference is made to the accompanying figures and descriptive matter in which a preferred embodiment of the invention is illustrated.

DESCRIPTION OF THE PREFERRED EMBODIMENT

Figure 1:
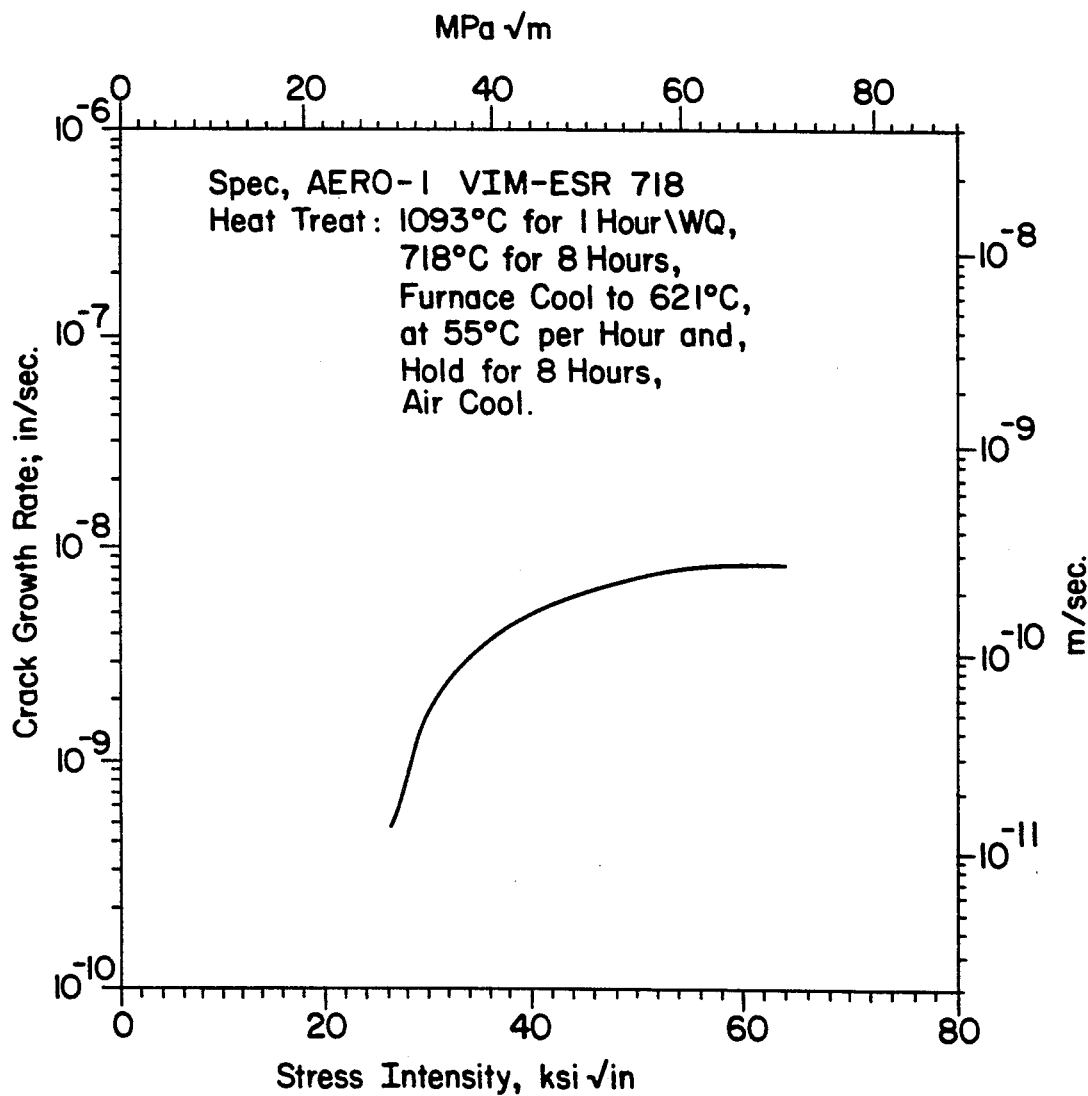
FIG. 1 is a graph plotting crack growth rate, in/sec, versus stress intensity, ksi/in, in 360° C. PWR primary water for Alloy 718 using the method of the present invention.

The performance of precipitation-strengthened, corrosion-resistant alloys, such as Alloy 718, in light water reactors is generally good. These alloys are often used for bolts, springs, guide tube pins, and other structural members where high strength, relaxation resistance, and corrosion resistance are required. Failures, which are infrequent considering the number of components in service, can be attributed to fatigue, corrosion fatigue, and intergranular stress corrosion cracking (IGSCC). The metallurgical condition produced by thermomechanical processing greatly affects intergranular stress corrosion cracking.

The present invention resides in an improved heat treatment method which increases the intergranular stress corrosion cracking resistance of Alloy 718 in hydrogenated aqueous environments, such as pressurized water reactor primary water. The conventional heat treatment method for Alloy 718 used for jet engine and nuclear service is set forth in Table I (below) and will be referred to hereinafter as the conventional heat treatment (CHT).

TABLE I
CONVENTIONAL HEAT TREATMENT

1) Anneal at 982° C. for one hour.
2) Air cool to room temperature.
3) Age at 718° C. for eight hours, and
4) Furnace cool at 55° C. per hour to 621° C.
5) Age at 621° C. for eight hours.
6) Air cool to room temperature.

The heat treatment method of the present invention, hereinafter known as the SCC-Resistant Heat Treatment is set forth in Table II below.

TABLE II
SCC-RESISTANT HEAT TREATMENT

1) Solution anneal at 1093° C. for one hour.
2) Water quench.
3) Age at 718° C. for eight hours, and
4) Furnace cool at 55° C. per hour to 621° C.
5) Age at 621° C. for eight hours.
6) Air cool to room temperature.

The key features of the improved heat treatment are the high solution annealing temperature and the rapid quench after annealing. The high annealing temperature dissolves grain boundary precipitates which are formed during thermomechanical processing of the ingot. These precipitates may include Laves, delta, and MC carbides, although they have not yet been precisely identified. The exact role of grain boundary precipitates in SCC has not been determined. It is possible that these precipitates act as local cathodes, causing the neighboring anodic matrix to be attacked by the environment. If environmental hydrogen plays a role in SCC, the grain boundary precipitates may act as traps where ionic hydrogen can collect and recombine into molecular hydrogen.

Slow strain rate testing is a common method utilized to evaluate the stress corrosion resistance of materials used in nuclear reactors. One method of slow strain rate testing, termed rising load testing, utilizes a fatigue precracked compact specimen and an electrical potential drop technique to measure crack growth rates during testing. Alloy 718 specimens in the two heat treatment conditions in Tables I and II were subjected to rising load SCC tests in pressurized-water-reactor primary water at 360° C. Comparison of FIGS. 1 and 2 demonstrates that the new SCC-resistant heat treatment (FIG. 1) cracks by SCC at a rate approximately one order-of-magnitude slower than the conventional heat treatment (FIG. 2).

Laboratory specimens of Alloy 718 are highly resistant to initiation of stress corrosion cracking (SCC) in PWR primary-side water in the absence of a significant stress intensifier, such as a fatigue precrack. Fatigue precracked specimens crack readily, however; $K_{ISCC}$ tests using precracked fracture mechanics specimens are a logical choice for characterizing the material behavior in the PWR primary-side environment.

There are numerous methods of conducting $K_{ISCC}$ tests but none of these has been standardized. There is little $K_{ISCC}$ data available for Alloy 718 in PWR primary water to provide guidance in choosing a test method. The experimental work reported is part of a larger matrix involving numerous combinations of melt practice and thermomechanical processing conditions. In order to obtain results in a timely manner, a rising load type of $K_{ISCC}$ test was selected, similar to that described by Mayville, et al, *J. of Testing and Evaluation*, Vol. 17, No. 4, July 1989, pp. 203-211 and Dietzel, et al, *Materialpruefung*, Vol. 28, No. 11, Nov. 1986, pp. 368-372. Recognizing that the severity of SCC depends upon applied strain rate, tests are conducted at progressively lower strain rates until the measured $K_{ISCC}$ reaches a minimum. Crack length is monitored remotely during testing, in this case using a reversing direct current (d.c.) electrical potential drop technique and a current of about 10-15 amps, K. H. Schwalbe, et al, *J. of Testing and Eval.*, Vol. 9, No. 3, 1981, pp. 218-220. Data is obtained in the form of crack growth rate as a function of applied stress intensity, K.

TABLE III
CHEMISTRY OF ALLOY 718 TEST MATERIAL

| Ti | Al | Nb | Ni | Fe | Mo | Cr | C | B | Si | Co | Mn | Ta | S | P | Cu |
|---|---|---|---|---|---|---|---|---|---|---|---|---|---|---|---|
| 1.04 | 0.46 | 5.23 | bal. | 19.50 | 3.11 | 18.30 | 0.035 | 0.004 | 0.059 | 0.24 | 0.16 | 0.051 | 0.001 | 0.015 | 0.049 |

Two 12.5-mm-thick compact fracture specimens were fabricated in the L-C orientation according to the ASTM Test for Plane-Strain Fracture Toughness of Metallic Materials (E399-83). The specimens were precracked by fatigue loading, with the final stress intensity range below 20 MPa/m for each specimen.

One specimen underwent the conventional heat treatment of Table I while the other specimen underwent the SCC-Resistant Heat Treatment method of the present invention.

The specimens were loaded into an autoclave mounted in a screwdriven loading machine capable of testing five specimens simultaneously. The autoclave was continuously refreshed with PWR primary-side water at 360° C. as specified in Table IV.

TABLE IV
PWR PRIMARY WATER SPECIFICATIONS

| | |
|---|---|
| Dissolved Oxygen | ≦0.01 ppm |
| Boric Acid | 5700 ppm (±500 ppm) |
| Lithium | 2 ppm |
| pH | 6.5 (±0.5) |
| Conductivity | <20 μmhos/cm |
| Dissolved Hydrogen | 15-50 Std cc/kg H$_2$O |
| Chloride | <0.1 ppm |
| Fluoride | <0.1 ppm |

Each specimen was loaded in tension at a constant displacement rate. Crack length was monitored throughout each test using the reversing d.c. potential drop technique and a current of 15 amps. Current was carried by leads screwed into the center top and center bottom of the specimen. Potential was measured using leads spot-welded diagonally across the crack mouth. Load was monitored with a load cell and displacement with a displacement transducer mounted on the load rod.

Figure 2:
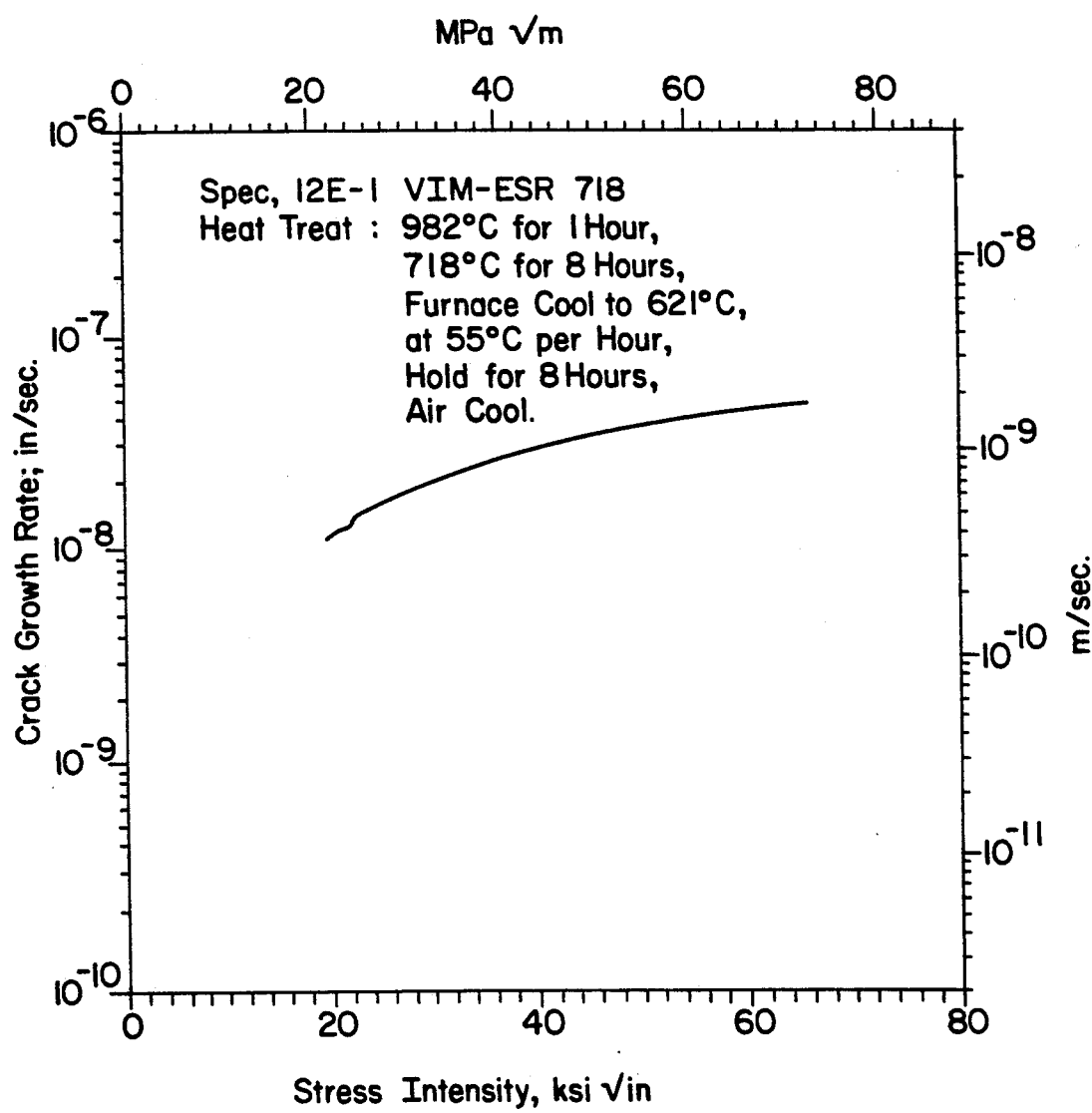
FIG. 2 is a graph plotting crack growth rate, in/sec, versus stress intensity, ksi/in, in 360° C. PWR primary water for Alloy 718 using the conventional heat treatment method in Table I.

The results are presented graphically in FIGS. 1 and 2. A comparison of FIGS. 1 and 2 demonstrates that the new SCC-resistant heat treatment as set forth in Table II cracks by SCC at a rate approximately one order-ofmagnitude slower than the conventional heat treatment shown in FIG. 2.

With the new heat treatment, the stress corrosion cracking resistance of Alloy 718 is significantly increased in aqueous environments with excess hydrogen. As a result, the increased SCC resistance maximizes component lifetime. The increased SCC resistance minimizes the occurrence of costly component failures.

While a specific embodiment of the invention has been shown and described in detail to illustrate the application and principles of the present invention, certain modifications and improvements will occur to those skilled in the art upon reading the foregoing description. It is thus understood that all such modifications have been deleted herein for the sake of conciseness and readability, but are properly within the scope of the following claims.

What is claimed is:

1. A method for increasing intergranular stress corrosion cracking resistance of Alloy 718 in water reactor environments, the Alloy 718 having about 1.0% titanium (Ti), comprising the steps of:
    annealing the Alloy 718 at about 1093° C. for about one hour;
    rapidly quenching the Alloy 718;
    aging the Alloy 718 at about 718° C. for about eight hours;
    cooling the Alloy 718 at about 55° C. per hour to about 621° C.;
    aging the Alloy 718 at about 621° C. for about eight hours;
    cooling the Alloy 718 to room temperature; and
    employing structural members fabricated from the Alloy 718 in a water reactor environment.

2. The method as defined in claim 1, wherein the water reactor environment is a light water reactor environment.

3. The method as defined in claim 1, wherein the water reactor environment is a pressurized water reactor environment.

4. The method as defined in claim 1, wherein the rapidly quenching step includes water quenching.

* * * * *